343-909 CROSS REFERENCE SEARCH ROOI

May 3, 1966 W. D. WILLIAMS 3,249,947

CONCAVE REFLECTOR WITH OPAQUE OPTICALLY REFLECTIVE
COATING TO PREVENT CONCENTRATION OF SOLAR ENERGY
Filed June 17, 1963

INVENTOR.
WARREN D. WILLIAMS
BY
S. C. Yeaton
ATTORNEY

United States Patent Office 3,249,947
Patented May 3, 1966

3,249,947

CONCAVE REFLECTOR WITH OPAQUE OPTICALLY REFLECTIVE COATING TO PREVENT CONCENTRATION OF SOLAR ENERGY

Warren D. Williams, Copiague, N.Y., assignor to Sperry Rand Corporation, Great Neck, N.Y., a corporation of Delaware Filed June 17, 1963, Ser. No. 288,425
6 Claims. (Cl. 343—912)

This invention relates to microwave antennas and more specifically to optical microwave antennas uesd in radio astronomy and space communication.

Radio astronomy and space communication applications frequently require the use of antennas employing parabolic reflectors. These antennas must be pointed skyward during normal operation and thereby intercept significant quantities of solar radiation. Because of the parabolic design, the solar energy is reflected toward the focal point of the reflector. Since many of these antennas require large reflectors, the reflected energy can cause serious heating problems. A thirty foot paraboloidal reflector, for instance, may collect 65 kw. of solar energy. If this energy were redirected and concentrated at the focus of the antenna, it would quickly destroy any subreflector or feed horn positioned there.

A related problem exists when using optical microwave antennas for tracking the re-entry of space vehicles. Large quantities of data must be collected in a matter of seconds. If the path of the vehicle happens to be aligned with the sun, the heat developed by the concentration of solar energy, even in such a short time interval, can distort the antenna elements and cause serious errors in the collected data.

Various schemes have been proposed to overcome this problem. Paint of various types and color, as well as various surface coatings, have been applied to the reflector surface in an attempt to absorb the incident solar energy. However, these coatings cause excessive heating of the reflector and thus distort the reflector so as to impair its usefulness.

Still other schemes have been proposed in which the surface of the reflector is formed into steps or terraces. These steps are sufficiently small so that they do not interfere with the microwave transmission but serve to direct most of the incident solar energy away from the focal point. Such antennas, however, are difficult to machine and particularly in the larger sizes become impractical to manufacture. Large reflectors may well require tolerances in the order of 0.016 inch so that the machining becomes a formidable problem.

Therefore, it is an object of the present invention to provide an antenna reflector that will be dimensionally stable even though the reflector intercepts considerable solar radiation.

It is another object of the present invention to provide an optical microwave antenna in which the feed horn or subreflector is not endangered by incident solar radiation.

Yet another object of the present invention is to provide a relatively inexpensive means for making an optical microwave antenna that is insensitive to solar radiation.

These and other objects are achieved by coating the main reflecting surface of an optical microwave antenna with a composite coating that permits specular reflection of incident microwave energy but causes scattering of incident optical energy.

Figure 1:
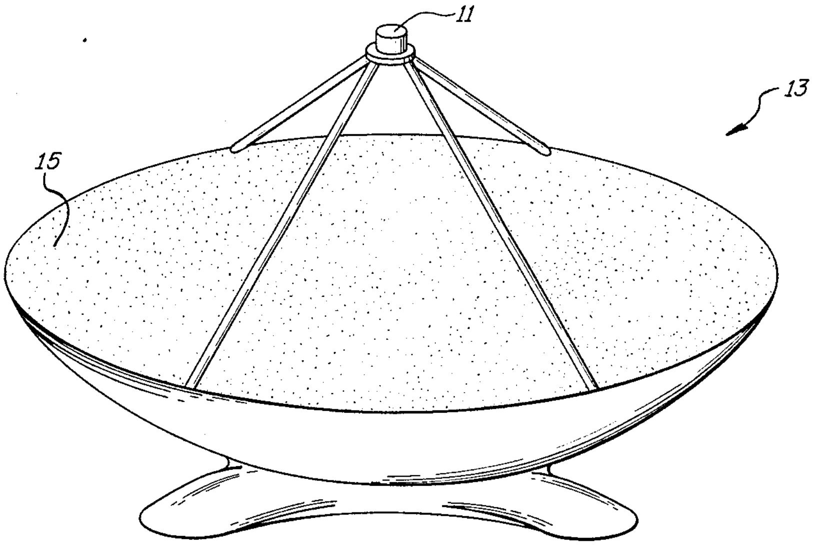
Figure 2:
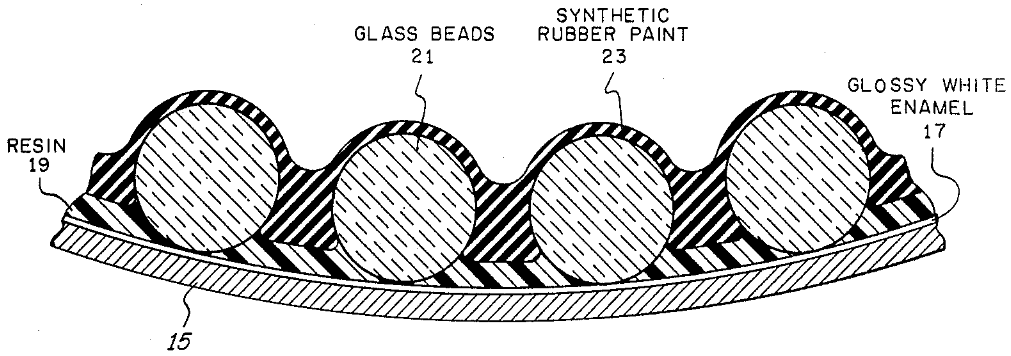

In the accompanying illustrative drawings:

FIG. 1 represents a typical optical microwave antenna incorporating the invention, FIG. 2 represents, in magnified form, a cross section of the composite coating applied to an antenna reflector in order to practice the invention.

In FIG. 1, a feed horn 11 is positioned at the focus of a paraboloidal reflector 13. During periods of transmission, microwave energy from the feed horn is directed toward the inner concave surface 15 of the paraboloidal reflector. Because of the geometry of the reflector, this energy is diverted and emerges from the antenna as a plane wave moving parallel to the axis of the feed horn. This action is reversible. Energy arriving from a distant source is essentially in the form of a plane wave. When the energy is intercepted by a paraboloidal reflector, it is redirected and propagates toward the feed horn.

Ordinarily if the antenna happens to be pointed toward the sun, as is frequently necessary in space communications, the solar radiation is concentrated at the focus of the reflector and the antenna effectively constitutes a solar furnace. The large concentration of energy can readily destroy any object placed at the focus.

Antennas constructed according to the principles of the present invention, however, employ a coating on the concave surface 15 which acts to scatter incident radiation in the optical region of the spectrum so as to avoid the concentration of energy which would otherwise occur.

A cross sectional diagram of a composite coating constructed in accordance with these principles is depicted in FIG. 2. A layer of optically reflective material 17 is first applied to the reflector surface 15.

A bonding coat 19, preferably of a clear resinoid material, is next applied over the reflective material 17 and a single layer of spherical glass beads 21 is then imbedded in the bonding coat. Finally, a resinoid finish coat 23 is applied over the glass beads.

The glass beads are fabricated from material having as high an index of refraction as practical. Modern optical glass beads can be produced with an index in excess of 1.9. Such high index glass beads are preferred in the present invention since their index contrasts sharply with the comparatively low index of suitable resinoid bonding materials. This discrepancy in indices produces copious scattering of the solar energy as will be demonstrated.

In a typical installation involving a C band antenna, a glossy white enamel was used for the reflective coat 17. A clear urethane resin was sprayed over the enamel to form the bond coat 19. This coat was applied in a film ranging in thickness from 0.002 inch to 0.003 inch. The particular urethane resin was produced by the Mobay Chemical Company and is described as formulation M-3 in the Mobay Surface Coating Manual, Supplement Bulletin M-1, dated April 1958. This formulation has a refractive index of 1.5 and provides the desired chemical stability and mechanical adherence. Before the urethane coating solidified, the layer of glass beads was sprayed into the coating with a conventional spray gun.

The beads were purposely limited to a single layer in order to provide as uniform a surface as practical. This required that the upper surface of the bead layer be free of any adhesive material to which a second layer of beads might adhere. In order to accomplish this objective, dry beads were sprayed onto the surface. No vehicle was used and no atomizing air was necessary since the beads themselves were already in the form of discrete particles. The absence of atomizing air flowing over the bond surface, furthermore, resulted in a slower drying rate of the bond coat.

The choice of bead size for a particular application is influenced by the microwave frequency to be employed. The mechanical tolerance allowed on the surface of a reflector may be in the order of 1/32 wavelength.

The surface unevenness contributed by the bead contours must be included in this tolerance limit.

The glass beads for the application previously mentioned were made from a lead-free, high index optical glass having a refractive index of 1.92. The beads ranged in diameter from 0.007 inch to 0.011 inch (60–80 mesh), and thus had a diameter equal to several hundred wavelengths of the incident solar radiation.

The force provided by the spray gun in applying the beads was adequate to drive them into the bond coat with sufficient momentum so that most of the beads actually contacted the reflective coating. These beads were packed closely enough so that subsequently applied beads could not enter the interstices. These subsequent beads, however, provided additional impact to help force the original bead into the bond coat. Since the upper surface on the bond coat remained well below the center of the imbedded glass beads, the subsequently arriving beads were not captured by the bonding material but merely rebounded from the previously imbedded beads. In this way, a layer consisting of a single thickness of beads was obtained. Since there was only a single layer of beads, the surface roughness of the composite coating was well within the limits necessary for efficient microwave operation.

The finish coat 23 was then sprayed over the beads to assist in the mechanical adherence of the beads and to provide additional environmental protection. A translucent DuPont Hypalon synthetic rubber paint, prepared in conformity with Military Specification MIL–P–9503B (USAF) was used for the finish coat. The coat had a refractive index of 1.52.

The various resinoid coatings as well as the beads themselves may be applied with a spray gun. Large antennas may be coated in the field if desired since only readily available equipment is needed.

Because of the relatively large discrepancy between the indices of refraction of the glass beads and the resin coatings in contact with the beads, rays of solar energy entering the glass beads are refracted to a considerable extent. A ray that enters a glass bead is refracted at each interface that it traverses in the composite coating. Many rays reaching the reflective coating 17 leave this coating at such an angle that the emergent ray passes through a different bead or beads than the same ray traversed in the incident direction. Furthermore, a portion of each ray is reflected at each interface. Consequently, each incident ray gives rise to a number of individual rays propagating in a variety of directions. The overall effect is to produce a random distribution of emergent solar energy. Since only a small portion of the emergent energy passes through the focus, a feed horn or sub-reflector positioned at that point is not exposed to an intense solar energy level.

Laboratory tests show, however, that the radio frequency energy is not noticeably affected by this coating, since the wavelength of this energy is many times the coating thickness.

Qualitative experiments were made with paraboloidal reflectors four feet in diameter to illustrate the effectiveness of the coating. A first reflector was coated only with the reflective coating 17. A second reflector of the safe type was coated with the composite coating described earlier. A piece of radome material was placed at the focus of each reflector and the reflectors were pointed towards the sun. The radome material suspended over the first reflector burned within a minute. The radome material suspended over the second reflector showed no signs of damage after 45 minutes exposure.

Further experiments were conducted with a 30 foot reflector for a Cassegrainian antenna. The main reflector surface was supplied with the composite coat described earlier. Thermocouples were placed near the focus of the main reflector. The ambient temperature was 81° F. on a bright sunny day. With the antenna pointed directly at the sun, the temperature rise detected by the thermocouples was approximately 1° F.

Although the presently preferred form of the invention utilizes beads with no surface coating of any kind, the beads may be pretreated with a beneficial coating if so desired. Any suitable coating with a refractive index significantly lower than that of the glass beads could be used.

The Mobay Chemical Company Manual previously mentioned, for instance, lists cellulose acetate butyrate as a flow and body agent in the M–3 formulation. When using this formulation as a bonding material, the beads could be pretreated with a cellulose acetate butyrate coating which would form a compatible mechanical link between the bead and the bond and greatly enhance the anchoring of the bead. This coating material has a refractive index of 1.48 which is significantly lower than the glass bead so that scattering of the incident solar energy would still occur.

Alternatively, the beads might be pretreated with a wash-primer such as vinyl butyral resin to increase the flexibility of the bond coat and the adherence in the presence of severe environmental conditions.

In some instances, it may be preferable to make the beads of some transparent material other than glass. Quartz or a transparent resin such as one of the methacrylates may be used if desired. In all instances, the refractive index of the bead material should be as different from the refractive indices of the bonding coat and finish coat as is practical.

In situations in which the antenna will not be subjected to severe environmental conditions, it is possible to eliminate the finish coat. This coat is applied principally for protection against weather and mechanical wear, but is not essential to the operation of the invention.

In some applications, the reflector surface 15 is naturally lustrous. In these cases, the surface itself may be used to reflect the solar energy so that it is not necessary to apply a reflective material to the concave surface of the reflector element.

The antennas that have been described have employed a light-scattering coating only on the main reflector element. In complex geometric optical antennas having a combination of reflector elements, however, any one or combination of the reflector elements may be coated if desired.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An optical microwave antenna comprising a concave reflector surface, an opaque optically reflective coating applied thereto, and a layer of glass beads bonded to the reflective coating, said beads having a cross section that is large in relation to the wavelength of visible light but small in relation to the wavelength of microwave energy.

2. An optical microwave antenna comprising a parabolic reflector, an opaque optically reflecting coating applied to the concave surface of said reflector, a single layer of spherical glass beads on said reflecting coating, said beads having a diameter that is large in relation to the wavelength of visible light but small in relation to the wavelength of microwave energy, and a clear resinoid bonding material securing the glass beads to the reflecting surface.

3. An optical microwave antenna comprising a parabolic reflector, an opaque optically reflecting coating applied to the concave surface of said reflector, a coat of resinoid bond applied to said reflecting coating, a layer of high index optical glass beads distributed over said bond coat, and a resinoid finish coat applied over said bond, said resinoid bond and finish coats having refractive indices in the range of 20%–25% lower than the corresponding index of the glass beads.

4. An optical microwave antenna comprising:
(a) a paraboloidal reflector,
(b) an opaque optically reflective coating applied to the concave surface of said reflector,
(c) a single layer of spherical glass beads distributed over the reflective coating so that the spacing between adjacent beads is less than one bead diameter,
(d) a clear resinoid bond coat securing the beads to the reflective coating, said bond coat having a thickness less than one-half the diameter of the beads, and
(e) a translucent resinoid finish coat applied over said beads,
(f) said resinoid bond and finish coats having a refractive index at least 20% lower than the corresponding index of the glass beads.

5. An optical microwave antenna comprising:
(a) a paraboloidal reflector,
(b) an opaque optically reflective coating applied to the concave surface of said reflector,
(c) a single layer of high index spherical glass beads distributed over the reflective coating so that the spacing between adjacent beads is less than one bead diameter,
(d) a clear resinoid bond coat securing the beads to the reflective coating, said bond coat having a thickness less than one-half the diameter of the beads, and (e) a translucent resinoid finish coat applied over said beads,
(f) said resinoid bond and finish coats having a refractive index approximately midway between the indices for air and the glass beads.

6. A C-band Cassegrainian antenna comprising:
(a) a main reflector,
(b) an opaque optically reflective coating on the concave surface of said reflector,
(c) a single layer of 60–80 mesh high index glass beads distributed over the reflective coating, said beads being distributed so that the spacing between beads is less than a bead diameter,
(d) a layer of clear resinoid bond coat securing the beads to the reflective surface, said bond coat having a thickness less than the bead diameter,
(e) a resinoid finish coat covering the beads,
(f) said bond and finish coats each having a refractive index approximately midway between the corresponding indices for air and the glass beads.

References Cited by the Examiner

UNITED STATES PATENTS

| | | | |
|---|---|---|---|
| 2,706,262 | 4/1955 | Barnes | 88—82 X |
| 3,108,279 | 10/1963 | Eisentraut | 343—914 X |

ELI LIEBERMAN, *Acting Primary Examiner.*

HERMAN KARL SAALBACH, *Examiner*

R. F. HUNT, *Assistant Examiner.*